JOHN M. ENOS & JOAB ENOS.
Improvement in Car Couplings.
No. 121,047. Patented Nov. 21, 1871.
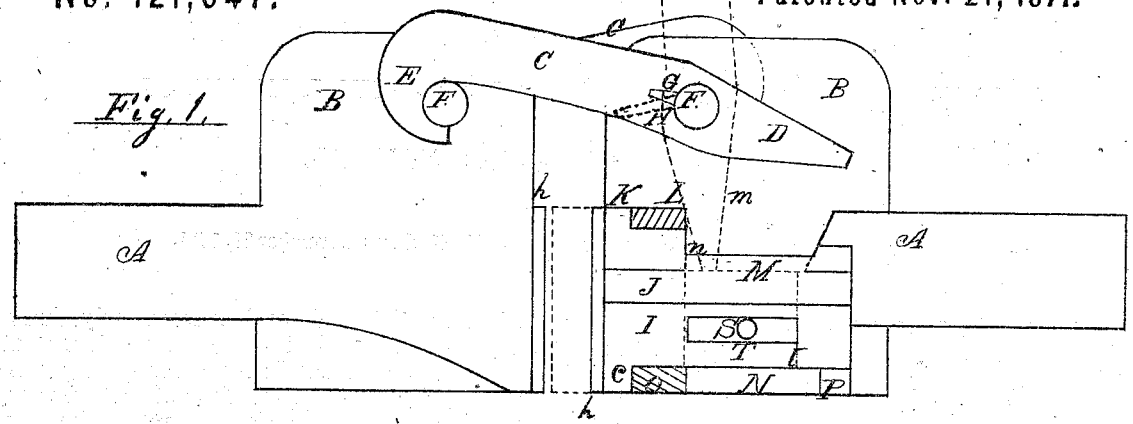
Fig. 1.
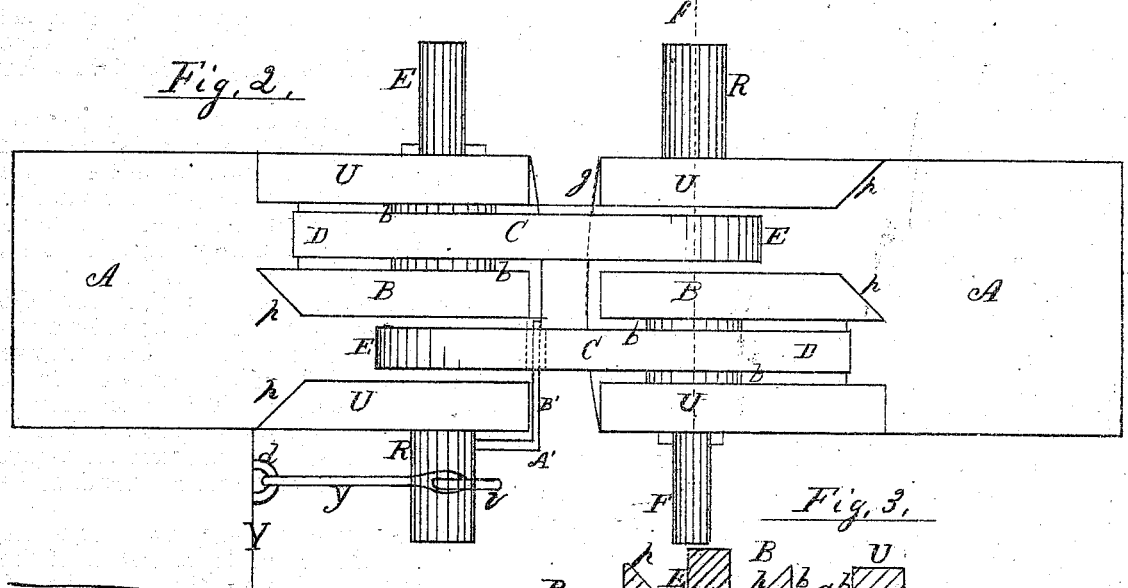
Fig. 2.
Fig. 3.
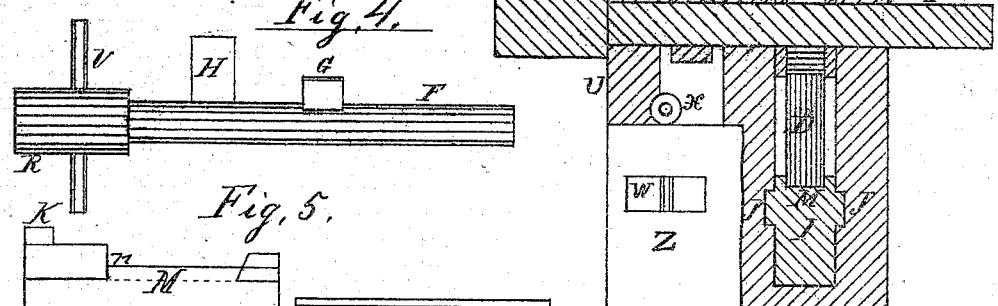
Fig. 4.
Fig. 5.
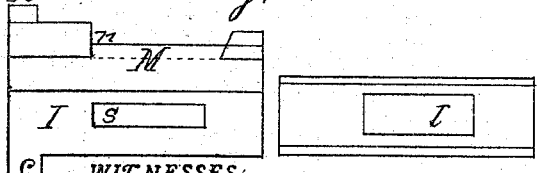
Scale 2 inches to 1 foot
WITNESSES:
Samuel N. Smith
Orin Bostwick
INVENTORS
John M Enos
Joab Enos
By G. L. Chapin
Atty 121,047

UNITED STATES PATENT OFFICE.

JOHN M. ENOS AND JOAB ENOS, OF ST. JOSEPH, MICHIGAN.

IMPROVEMENT IN CAR-COUPLINGS.

Specification forming part of Letters Patent No. 121,047, dated November 21, 1871.

*To all whom it may concern:*

Be it known that we, JOHN M. ENOS and JOAB ENOS, of St. Joseph, in the county of Berrien and State of Michigan, have invented an Improved Car-Coupling, of which the following is a specification.

The present invention relates to an improved car-coupling which may be operated automatically or in the ordinary manner; and its nature will be fully understood by the following specification:

In the drawing, Figure 1 is a longitudinal sectional elevation of our improved car-coupling; Fig. 2, a top or plan view thereof; Fig. 3, a sectional elevation taken on the line $f$, Fig. 2. Fig. 4 shows the shaft which raises the hooks or catches, and on which the hooks catch; Fig. 5, the toggle-slide.

A represents the draw-bars of the coupling; $h\ h$, the buffers; and U B U, the upwardly-projecting standards or frame which supports the shaft F. The standards U B U are beveled off at their ends and tops $p\ p$, so that the hooks C will catch onto the shafts F when the cars have opposing lateral positions. The hooks, Figs. 1, 2, and 3, are fastened to the shafts F, so as to be lifted up by means of lugs G, cast solid or otherwise fixed to said shaft. The shafts F are also provided with lifters or cams H, placed at suitable distances from the lugs G, to raise the opposite end of the hook fastened to the other part of the coupling. By this means the turning of either of the shafts F will lift both hooks off of said shafts, inasmuch as each hook is fastened to its respective shaft and catches onto the shaft in the opposite half of the coupling, as clearly shown. The hooks C are provided with projecting ends D in order that they may be made to couple automatically by means of toggle-slides I, which are arranged to have reciprocating movements in the buffers $h\ h$, and which have mortises M in their top parts to receive the ends D of the hooks C, the slides being held from moving too far by pins T put through the buffers, and through the slots S in the slides, as shown in Fig. 1. By this means, when the hooks are raised up, as shown by dotted lines $m$, Fig. 1, they are held nearly in vertical positions, so as to catch properly onto the shafts F, and in being raised they strike against the shoulder $n$ of the mortise M and move the toggle-slides I out from the buffer, so that, when the buffers come together, as when the cars are being coupled, the slides will be driven in and, consequently, throw the hooks over the shafts F. As will be seen at Figs. 1 and 3 the slides I are vertically very wide from $k$ to $c$, by which means the buffer of one car, although lower than the other car, will be sure to strike the slides.

To prevent ice and cinders from filling up the mortise M a hole is made through the slide, as shown by dotted lines $t$, Fig. 1, and at inverted view at Fig. 5.

To allow the hooks C to have a swinging movement laterally, and also to remain parallel with the draw-bar when not drawn sidewise by the lateral movement of the cars, rubber washers $b\ b$, Figs. 2 and 3, are placed between the standards U B and hooks. Coil springs, however, may be substituted for the rubber.

In Fig. 3, Z represents a part of the face of the buffer, the other portion of the figure being a section, and at $w$ in Z is made a mortise to receive the ordinary link coupling when only one car is provided with our coupler. This arrangement is important, otherwise our device could not well be applied, inasmuch as all of the cars on a road could not well be provided with our device at the same time.

At A′ B′, Fig. 2, is shown an elbow-lever, which is rigidly attached to the large end R of the shaft F, and made to extend through the hook C, a slot in the hook being made for that purpose, so that when the shaft C is turned the said lever will raise the hook. This device is considered an equivalent of the lug G, shown at Fig. 1. To hold the hooks up and prevent them from coupling when trains are to be made up, a loop-rod, $y$, is jointed to the platform Y of the car and put over the lever V, as shown in Fig. 2, a rod being used on each platform so as to hold up both hooks. These levers V are long enough to be operated by a person standing outside of the track or rails, and they may, by suitable connecting-rods, &c., be operated from the tops of freight cars.

We claim as our invention—

The hooks C provided with elongated ends D, mortised toggle-slide I, shafts F provided with lifters H, in combination with buffers $h\ h$ and standards U B, substantially as described.

JOHN M. ENOS.
JOAB ENOS.

Witnesses:
M. A. DE LANY,
J. B. HINTON.

(122)